(No Model.)
J. E. LANGDON.
JOINT OR COUPLING FOR RODS, &c.
No. 285,493. Patented Sept. 25, 1883.
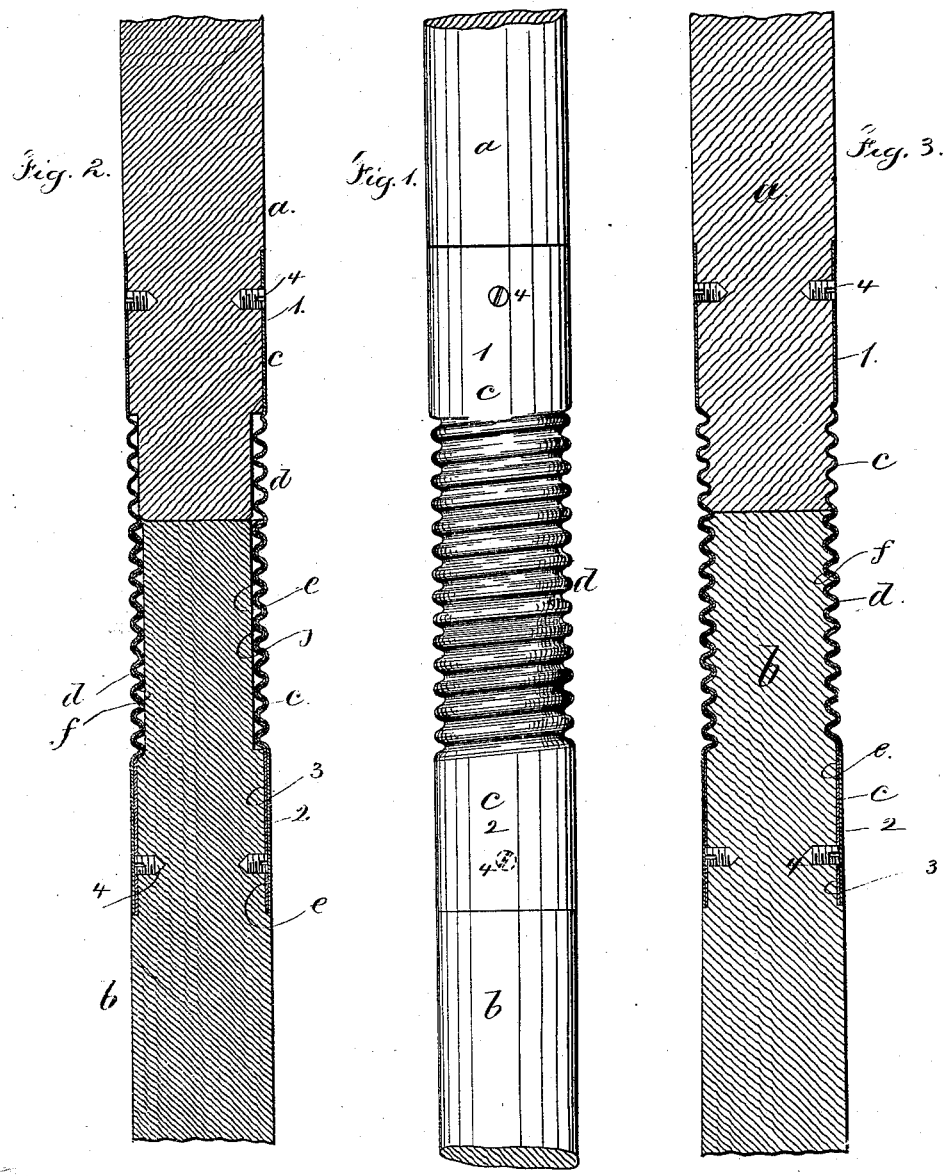
Witnesses
J. Staib
Chas H Smith
Inventor
James E. Langdon
per Lemuel W. Serrell
and Harold Serrell
atty

UNITED STATES PATENT OFFICE.

JAMES E. LANGDON, OF TORRINGTON, CONNECTICUT, ASSIGNOR TO THE UNION HARDWARE COMPANY, OF SAME PLACE.

JOINT OR COUPLING FOR RODS, &c.

SPECIFICATION forming part of Letters Patent No. 285,493, dated September 25, 1883.

Application filed August 7, 1883. (No model.)

*To all whom it may concern:*

Be it known that I, JAMES E. LANGDON, of Torrington, in the county of Litchfield and State of Connecticut, have invented a new and useful Improvement in Joints or Couplings for Rods, &c.; and the following is declared to be a description of the same.

Cleaning-rods for guns, poles for fishing, whips, &c., are usually jointed, so that they can be separated or unjointed, when desired, and placed in a small compass for carrying conveniently; or said joints are made for convenience in manufacturing. These joints have generally been made in one of two ways—viz., the slip-joint and screw joint or coupling. The slip joint or coupling is a short section of tube, one end of which is secured upon one end of a joint, the other end of said tube being open for the reception of the end of another joint. The screw-coupling is made in two pieces, each one fastened upon the joints of the rod, one piece having a male screw-thread upon its reduced end, the other piece being made tubular, with a female thread for the reception of the other or companion piece.

My invention relates to a coupling that is simple, efficient, and easily applied; and it consists in two sections of tubes, upon the surface of each of which is formed a screw-thread. Each of these tube-sections is fastened on opposing ends of the rod-joints, and one section is smaller than the other and adapted to pass partially within the same, and by the screw-thread upon its surface to engage the screw-thread in the outer tube, and so secure the parts together. The screw-threads formed in the surface of these tube-sections may be rolled in while the sections are separated from the joints of the rod; or the sections may be put upon the ends of the rod-joints and the screw-threads rolled into their surfaces, thus embedding the surface of the metal into the wood of the rod and holding the sections in place.

In the drawings, Figure 1 is an elevation of the coupling and a portion of the joints of the rod. Fig. 2 is a vertical section of the same, and Fig. 3 is a vertical section of a modification of the same.

The two joints *a b* may be portions of a gun-cleaning rod, of a fishing-pole, or any other form of joint-rod. The tube-section *c* is formed of thin metal, with a screw-thread, *d*, rolled into the same, and the ends 1 2 are for a short distance preferably made plain. The screw-thread may, however, extend the whole length of the section *c*. The tube-section *e*, also of thin metal, is shorter than the section *c*, and one end has a screw-thread, *f*, rolled into its surface, the other end, 3, being plain. The screw-thread may also in this case extend the whole length of the section *e*. The screw-threads *d f* are alike, and when connected together will properly secure the parts, the section *c* entirely covering up the section *e* and appearing as only one tube. The section *c*, if desired, may only partially cover the section *e*. In both cases, however, the ends of the rod-joints are preferably brought together within the sections. I drive these screw-sections *c e* upon the rod-joints *a b*, and secure them with the pins or screws 4. These may, however, as heretofore stated, be placed upon the ends of the joints *a b*, and the screw-threads *d f* be formed in their surface thereafter, thus bedding the metal of the sections into the wood of the joints, as shown in Fig. 3. This will form a very solid joint or coupling, that cannot be pulled apart. I propose to make these couplings of various sizes, such as will be adapted to the joints of ramrods, fishing-poles, whips, &c.

I claim as my invention—

1. A coupling for the joints of rods, &c., composed of two tubular sections, *c e*, of thin metal, each having a screw-thread rolled into its surface, the section *c* being longer than the section *e* and covering said section *e*, when the parts are connected together substantially as set forth.

2. In combination with the rod-sections *a b*, a tubular coupling composed of the screw-tubes *c e*, in each of which is rolled or formed a screw-thread which performs the double duty of holding the tube-sections upon the rod-joints and coupling the sections together, substantially as set forth.

Signed by me this 1st day of August, A. D. 1883.

JAMES E. LANGDON.

Witnesses:
M. B. DUNBAR,
J. F. CALHOUN.